(12) United States Patent
Hobson, Jr.

(10) Patent No.: US 6,309,552 B1
(45) Date of Patent: Oct. 30, 2001

(54) SLACK FILTER TUBE HAVING AN INTERNAL RESILIENT SUPPORT EXTENDING THERE THROUGH

(76) Inventor: Russell B. Hobson, Jr., Mill Creek Rd., Old Fort, NC (US) 28762

( * ) Notice: Subject to any disclaimer, the term of this patent is extended or adjusted under 35 U.S.C. 154(b) by 0 days.

(21) Appl. No.: 09/551,177

(22) Filed: Apr. 17, 2000

Related U.S. Application Data

(63) Continuation-in-part of application No. 09/072,867, filed on May 5, 1998, now Pat. No. 6,051,138.

(51) Int. Cl.$^7$ ................................................ B01D 24/00
(52) U.S. Cl. ................ 210/791; 210/232; 210/323.2; 210/486; 210/495; 210/497.01; 210/356; 210/359; 55/379; 29/902; 29/525.12
(58) Field of Search .................... 210/323.2, 457, 210/497.01, 350, 352, 193, 383, 384, 385, 494.1, 486, 495, 356, 359, 232, 777, 791; 55/379, 475; 29/902, 525.11, 525.12

(56) References Cited

U.S. PATENT DOCUMENTS

| Re. 24,136 | 4/1956 | Marvel . |
|---|---|---|
| 82,255 | 9/1868 | Simmons . |
| 673,398 | 5/1901 | Keller . |
| 707,811 | 8/1902 | Monjeau . |
| 1,040,342 | 10/1912 | Johnson . |
| 1,489,519 | 2/1924 | Chateau . |
| 1,741,705 | 12/1929 | Liddell . |
| 1,905,738 | 4/1933 | Norquist . |
| 1,928,670 | 10/1933 | McCrery . |
| 1,935,136 | 11/1933 | Thibert . |
| 2,014,105 | 9/1935 | Dooley . |
| 2,035,758 | 3/1936 | Pierce . |
| 2,067,439 | 1/1937 | Dooley . |
| 2,145,047 | 1/1939 | Goldkamp . |
| 2,274,352 | 2/1942 | Wood . |
| 2,301,430 | 11/1942 | Malanowski . |
| 2,350,011 | 5/1944 | Black . |
| 2,475,561 | 7/1949 | Cooperider . |
| 2,480,320 | 8/1949 | Carrier . |
| 2,480,653 | 8/1949 | Hoefer, Jr. . |
| 2,570,132 | 10/1951 | Koupal . |
| 2,788,129 | 4/1957 | Thompson . |
| 2,819,800 | 1/1958 | Goodloe . |
| 2,835,391 | 5/1958 | Bottum . |
| 2,934,209 | 4/1960 | Franck . |
| 3,055,290 | 9/1962 | Arvanitakis . |
| 3,065,856 | 11/1962 | Goldman . |
| 3,100,190 | 8/1963 | Hobson, Jr. . |
| 3,216,572 | 11/1965 | Kasten . |
| 3,219,072 | 11/1965 | Lau . |
| 3,279,608 | 10/1966 | Soriente . |
| 3,310,175 | 3/1967 | McLagan . |
| 3,319,793 | 5/1967 | Miller, Jr. . |
| 3,327,864 | 6/1967 | Ball . |
| 3,362,535 | 1/1968 | Kasten . |

(List continued on next page.)

FOREIGN PATENT DOCUMENTS

| 1310 | 1/1866 | (BR) . |
|---|---|---|
| 2374936 | 8/1978 | (FR) . |

Primary Examiner—Matthew O. Savage
Assistant Examiner—Richard W. Ward
(74) Attorney, Agent, or Firm—Weingram & Associates, P.C.

(57) ABSTRACT

A filter tube for use in earth coated type filters includes a flexible permeable tubular sheet internally supported by a helical spring. The internal spring is connected between opposite ends of the filter tube to support the full length of the tube wall. One end of the tube is connected to an external spring and anchor plate. In a slack position, the tube end folds over an end collar connected to the spring. Extension of the anchor plate applies tension to stretch the spring and tube to a taut position during a cycling operation which oscillates the tube to dislodge accumulated material.

11 Claims, 9 Drawing Sheets

U.S. PATENT DOCUMENTS

| | | |
|---|---|---|
| 3,386,587 | 6/1968 | Mast . |
| 3,394,067 | 7/1968 | Shirley . |
| 3,394,815 | 7/1968 | Harms . |
| 3,407,572 | 10/1968 | Tolley . |
| 3,447,690 | 6/1969 | Kracklauer . |
| 3,532,220 | 10/1970 | Lewis . |
| 3,576,444 | 4/1971 | Roberts . |
| 3,578,175 | 5/1971 | Manjikian . |
| 3,601,795 | 8/1971 | Shimizu . |
| 3,609,681 | 9/1971 | Saul . |
| 3,642,141 | 2/1972 | Hobson, Jr. . |
| 3,728,676 | 4/1973 | Brown . |
| 3,868,325 | 2/1975 | Otto . |
| 3,937,281 | 2/1976 | Harnsberger . |
| 4,048,075 | 9/1977 | Colvin . |
| 4,058,464 | 11/1977 | Rogers . |
| 4,063,217 | 12/1977 | Hyde . |
| 4,094,784 | 6/1978 | Hirano . |
| 4,157,900 | 6/1979 | Margraf . |
| 4,246,114 | 1/1981 | Krebs . |
| 4,292,180 | 9/1981 | Zylka . |
| 4,340,477 | 7/1982 | Hobson, Jr. . |
| 4,422,938 | 12/1983 | Miller . |
| 4,427,547 | 1/1984 | Miller . |
| 4,439,327 | 3/1984 | Muller . |
| 4,526,688 | 7/1985 | Schmidt, Jr. . |
| 4,552,661 | 11/1985 | Morgan . |
| 4,714,557 | 12/1987 | Croket . |
| 4,783,259 | 11/1988 | Wade . |
| 4,836,922 | 6/1989 | Rishel . |
| 4,836,936 | 6/1989 | Schewitz . |
| 4,859,988 | 8/1989 | Holtvluwer . |
| 4,867,771 | 9/1989 | Brennecke et al. . |
| 4,872,981 | 10/1989 | Hobson, Jr. . |
| 4,878,042 | 10/1989 | Eggiman . |
| 4,919,801 | 4/1990 | Hobson, Jr. . |
| 4,944,873 | 7/1990 | Williams . |
| 5,084,176 | 1/1992 | Davis . |
| 5,114,583 | 5/1992 | Concin . |
| 5,128,032 | 7/1992 | Rosaen . |
| 5,156,749 | 10/1992 | Williams . |
| 5,202,017 | 4/1993 | Hunter . |
| 5,221,469 | 6/1993 | Nehls . |
| 5,227,076 | 7/1993 | Bogen . |
| 5,230,131 | 7/1993 | Hobson, Jr. . |
| 5,389,913 | 2/1995 | Boser . |
| 5,407,570 | 4/1995 | Hobson, Jr. . |
| 5,426,414 | 6/1995 | Flatin . |
| 5,440,288 | 8/1995 | Gottlieb . |
| 5,441,633 | 8/1995 | Schewitz . |
| 5,445,738 | 8/1995 | Fry . |
| 5,449,468 | 9/1995 | Trummel . |
| 5,482,594 | 1/1996 | Salminen . |
| 6,051,138 * | 4/2000 | Hobson, Jr. . |
| 6,217,781 * | 4/2001 | Hobson, Jr. . |

* cited by examiner

SLACK FILTER TUBE HAVING AN INTERNAL RESILIENT SUPPORT EXTENDING THERE THROUGH

This application is a continuation-in-part of Ser. No. 09/072,867, filed May 5, 1998, issued as U.S. Pat. No. 6,051,138, Apr. 18, 2000.

BACKGROUND OF THE INVENTION

1. Field of the Invention

This invention relates to filter tubes and specifically to filtering devices and filter tubes used for pressure filters employing diatomaceous earth, known as bump filters.

2. Description of the Prior Art

Filter tubes utilizing earth coatings over a braided tube have met with a large degree of success in the filter industry especially for high volume fine filtering. Normally, the filter tube consists of an outer braided portion or sheet supported by an inner spring which gives the tube its shape and body. The end of the tube sheet intended to be mounted, usually has a collar device to which the outer sheet or skin of the outer filter tube is sealed and the end is closed. The opposite end of the tube sheet is closed either in the standard tube by sealing the ends or in the recyclable tube by means of a screw fastening that engages with the spring. The inside of the filter tube confines the spring which holds the skin relatively stationary during normal operations. This will enable a coating of filtering particles to build up on the outside of the tube to act to produce the filtering effect.

Examples of such prior art filters are found in U.S. Pat. Nos. 3,100,190; 3,642,141; 4,872,981; 5,230,131 and 5,407,570 to Hobson which are incorporated herein by reference.

Additional examples of prior art filters and related apparatus are shown in the following patents.

U.S. Pat. No. 2,480,320 to Carrier discloses filtering apparatus supporting a plurality of filter elements at the upper and lower ends. A spring and motor at the upper end provide oscillations for removal of sludge. The upper supporting end is removable to permit removal and replacement of filters.

U.S. Pat. No. 2,570,132 to Koupal concerns apparatus for cleaning filter elements of the air-bump wash types. Loss of air is avoided by provision of a solid wall in the inlet chamber as a more suitable air storage space. The need for airtight seals is eliminated and previous impervious upper portions of the filter elements are omitted and the full length of the filters can be used with shorter elements.

U.S. Pat. No. 2,934,209 to Franck describes a fluid dehydrator with improved filtering. The fluid to be dehydrated is passed through a shell filled with a desiccant which can be contaminated by oil in the fluid. A strainer is employed at the inlet to strain out particulate material before passing through the desiccant. A second filter at the outlet provides further filtering of the fluid passing into a second desiccant chamber.

U.S. Pat. No. 4,094,784 to Hirano discloses apparatus for filtering, dehydrating and drying suspension material. A filter mesh is supported on a rotatable valve plate in a vertical cylinder. The mesh collects a cake which is dried, vibrated and dropped through a lower opening by tilting the plate.

U.S. Pat. Nos. 4,422,938 and 4,427,547 to Miller concern a backwashing filter apparatus which utilizes an inner tapered housing to provide an annular outer flow passage that decreases from inlet to outlet. This provides a uniform liquid velocity through the filter in both forward and back flow operation. A grid support for the inner filter is formed of a plurality of ring-like segments stacked end to end.

U.S. Pat. No. 4,552,661 to Morgan describes a liquid filter device having replaceable self-retaining filtering bags which are formed to snap fit into a groove within the upper portion of the filter housing.

It has been noted that these earth filtering type of apparatus have various phases to the filtering cycle, one phase of which requires back flushing and shaking or bumping to remove the existing contaminated filtering coat and the other to then reapply the coat. During this time, it is possible for particles of dirt in the system to pass through the skin of the filter tube. Not all of these particles may pass from the filter tube beyond the tube sheet and be expelled prior to the succeeding filtering operation. Instead they may settle to the bottom of the filtering tube where they can remain until an inopportune time arises during the normal filtering cycle and then these particles will pass into the filtrate producing a contamination and a less than optimum result of the filtering process.

Heretofore in the past it has been difficult if not impossible to remove these entrapped particles of dirt from the filter and stream because they are usually at the end of the tube where the velocity stream is the lowest and there is the least agitation. The greatest velocity of particles passing through a tube will usually occur at the point near the tube support sheet.

OBJECTS AND SUMMARY OF THE INVENTION

It is therefore an object of the present invention to provide an improved filter tube having an end adapted to be attached to a tube cover sheet and another end having means for applying tension thereto.

It is another object of the present invention to provide an improved filter tube having one end which has no internal tube support and includes means for applying tension at that one end.

An additional object of the present invention is to provide an improved filter tube having internal supporting means secured between opposite ends and a slack outer wall which is stretchable under tension.

It is a further object of the present invention is to provide an improved filter tube which enables the remote end of the tube to be oscillated.

It is still another object of the present invention is to provide an improved filter tube which allows for the removal of accumulated contaminants or foreign objects from the inside of the tube.

It is also an object of the present invention to provide an improved filter tube which allows for oscillation of the tube to enable the contaminants in the tube to be flushed from the tube during the standard filter cycle.

It is also an object of the present invention to enable the tube to operate either in a vacuum environment or in a pressure environment so that the filter can work by means of a vacuum imposed on the outlet of the filter as well as by placing positive pressure on the inlet.

It is an additional object of the present invention to provide means to place the filter having an unsupported free end into tension to maintain the position and tension on the skin of the filter during normal filtering operations.

Still another object of the present invention is to provide a novel means of supporting the free end of the filter which can be used to adjust the tension of the filter during normal filtering operations and relax the tension during other phases of the filtering cycle in order to oscillate the free end of the filter.

It is a further object of the present invention to provide an improved filter tube which is durable, relatively easy to manufacture, simple in construction, provides improved filtering, and which reduces the contamination level from the filtrate.

Yet another object of the present invention is to provide a filter tube having a sealed end which is, durable, reliable, and relatively inexpensive.

Another object of the present invention is to provide a method for fabricating filter tubes that is simple, easy to accomplish, efficient, reliable, durable, cost effective, does not require sophisticated tooling, and uses easily obtained standard materials.

Accordingly, the present invention provides a new and improved filter tube for use in earth type or coated type filtering processes in which in one embodiment the filter tube is internally supported between opposite ends and includes a slack outer wall which is stretchable under tension. In another embodiment, the filter tube is internally supported only partially along its length and having a free end which is capable of being manipulated, as for example by oscillating the free end in order to dislodge any quiescent contaminant material which has accumulated in the remote end of the filter tube. Additionally, once oscillation of the free unsupported end of the tube is accomplished, means are provided to support the unsupported end of the tube so that the entire tube still remains in tension as it would if it were housing a spring over the length of the tube.

In another embodiment of the invention, the filter tube is sealed at one end by a deformable member which is placed within the internal support of the tube at the end of the tube. A sealing member is then inserted into the deformable member producing a seal between the sealing member and the deformable member and between the deformable member and the tubular sheet.

Other objects and advantages will become apparent from the following description in conjunction with the accompanying drawings.

DESCRIPTION OF THE INVENTION

Figure 1:
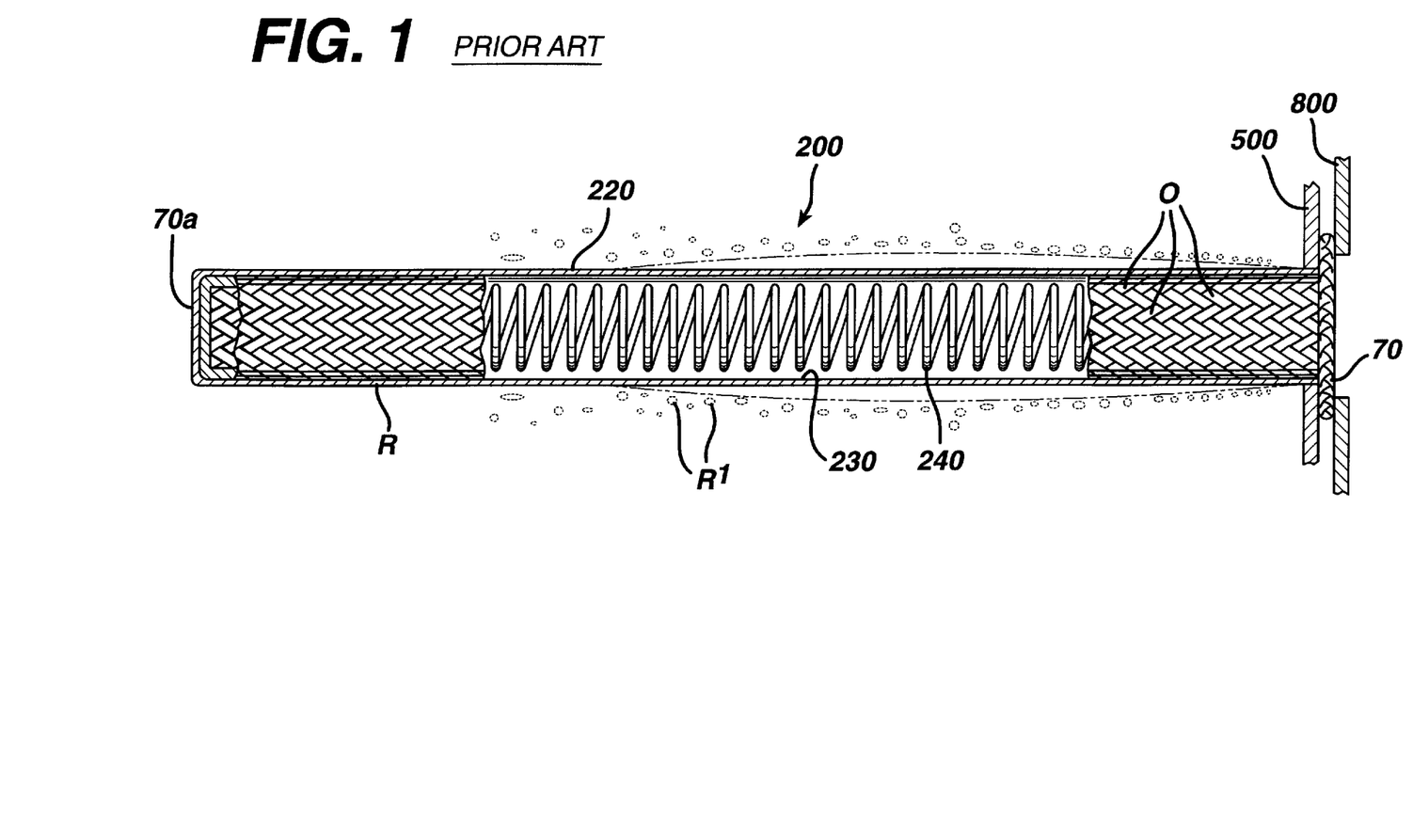
FIG. 1 shows a standard filtering tube with a internal spring supporting a skin of braided material.

Referring to FIG. 1, a prior art type filter includes a filter tube generally indicated at 200 having a skin or tube wall 220 formed of a plurality of groups of strands. Each group comprises several strands so as to form a woven helical pattern. As explained in detail in U.S. Pat. No. 3,100,190, the structure of the strands which are gathered into the groups and again woven to form the wall of the tube provides a porous surface through which filtering aids, either diatomaceous earth or a pearl-like cellulose material are applied.

As described in U.S. Pat. No. 3,100,190, the filter tubes are of a predetermined normal diameter and length having their ends opposite the inlet flanges closed and having their side walls so constructed that the tubes will change in length and in diameter in response to changes in the pressure of the backwash liquid and thereby loosen the accumulated layer of diatomaceous earth or similar "filter aid" from the wall of the tube and cause the dislodged layer to fall away from the tube by gravity. More particularly, the filter tube including portions of its side wall on which the layer of powder accumulates shall be capable of movement relative to other portions of said wall under the pressure of the backwash liquid so that the relative movement of said wall portions disengages the accumulated layer of "filter aid" from the tube. The filter tube is formed of interlaced or braided wires that extend helically in the tube wall at angles to a diametral plane of the wall, i.e. a plane perpendicular to the axis of the tube, such that when there is a liquid pressure differential between the inside and the outside of the tube, the wall of the tube either will be elongated and decreased in diameter or shortened and increased in diameter, depending upon the angular relation of the wires to said diametral plane and whether the higher pressure is on the inside or the outside of the tube.

While the construction of the tube wall may be varied, one preferred form comprises wires woven in generally known manner with a so-called "basket" weave in which a plurality of groups of wires, each group including a plurality of wires, for example twelve, of small diameter, for example 0.008 inch, are braided with the wires running helically of the tube wall and with the groups of wires braided in the so-called "plain" or "over two-under two weave," which is frequently used in making tubular braids such as are applied to wires or hose. For convenience in manufacture, the wires may be initially braided on known machines so that the angle of the wires of each group of wires with said diametral plane of the tube is about 35°16' so as to balance the end and side wall pressures and produce a stable construction which will neither swell nor elongate under pressure. This angle is sometimes called the "neutrality" angle. While the diameter of the tube may vary, a desirable tube is initially formed with a diameter of about 1¼ inches, and the tube is then drawn through a die to reduce its diameter to about 7/16 inches and at the same time rearrange the wires in tube wall to such an angle to said diametral plane that the diameter and length of the tube will change under variations in pressure on the walls of the tube. The wires may be disposed at an angle of more than 35°16' to a diametral plane of the tube. With such a tube installed in a filter, the length of the tube will be increased and the diameter will be decreased under a pressure differential of the liquid on the tube wall with the higher pressure outside of the tube. The elongation and diminution in diameter of the tube should be limited, for example by a helical spring or a rigid perforated cylinder loosely disposed within the tube with its peripheral surface normally spaced from but abuttable by the tube surface so as to prevent total collapse of the tube. The wires and their weave are such that upon release of the tube wall from the pressure differential, the wall will automatically return or spring back to its original and normal condition.

As shown in FIG. 1, the outlet end of the filter has a flange (70) which is supported between a tube sheet in the filter housing and a hold down plate 800 which is used to hold the filter tube and also to restrain the spring 240 located inside the filter tube. The spring abuts against the bottom (70A) of the filter tube and stretches the tube. During normal operations, a coating cycle applies a fine powder such as diatomaceous earth or other filtering aid to coat the outer portion of the tube to provide the filtering effect. When the amount of particulate matter that has been collected by the filtering earth becomes sufficient to totally clog the filter, a backflush cycle is initiated in which the system is backflushed to cause the flow to reverse from the inside of the tube to the outside rather than from the outside to the inside.

The reverse flow breaks the cake of filtering aid or filtering powder and then a pre-coating cycle is started in which the system is operated and the powder is allowed to form around the filter tube. A problem that has occurred in the past is that during the pre-coating cycle or the back flushing cycle, particulate matter enters the filter tube. Since these tubes are usually positioned vertically with the output at the upper end, the particulate matter will fall to the bottom of the tube. Because of the physics of the filter tube and assuming that there is a uniform filtration rate along the length of the tube, the velocity at the output end of the tube will be substantially greater than the velocity at the end of the tube remote from the outlet and there will be tendency for a relatively quiet spot to form which with the assistance of gravity will become a settling pool for any particular matter that is located within the tube.

The back flushing operation does not remove this sediment that has accumulated at the bottom of the tube and accordingly after the new precoat cycle and filtering resumes, the sediment still exists and it is not unusual for portions of the sediment to migrate up into the fluid flow of the filtrate that is flowing inside the tube.

Figure 2:
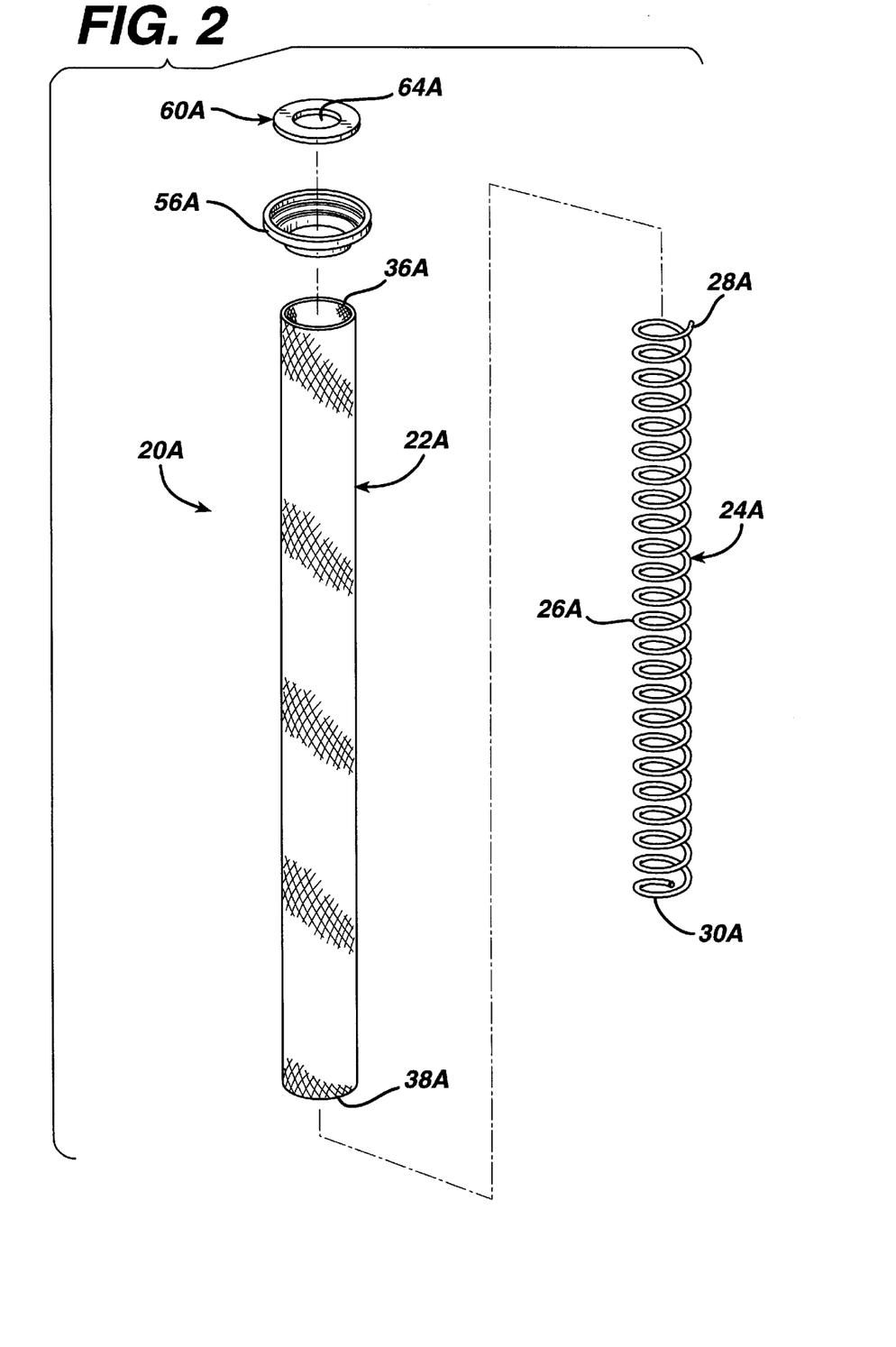
FIG. 2 shows an exploded view of the improved filtering device of a type shown in FIG. 1.

To overcome this problem, the present invention provides a means for agitating the end of the tube remote from the outlet to disturb this quiescent area and therefore to move any accumulated sediment out of this area to provide a cleaner filtered area in the tubes during the filtering cycle. FIG. 2 shows a filtering tube with one embodiment of an improved design in an exploded view. Specifically, a filter tube generally indicated at 20A has a tube wall 22A with an internal spring generally indicated at 24A having widely pitched helical sections 26A. The outlet end of the spring 28A is adapted to rest against a washer 60A that fits into a flange 56A sealingly connected to the outlet end 36A of the tube. The end of the spring 30A remote from the outlet end 28A is substantially shorter than the length of the tube, and the end of the tube 38A is remote from the outlet end 36A.

Figure 4:
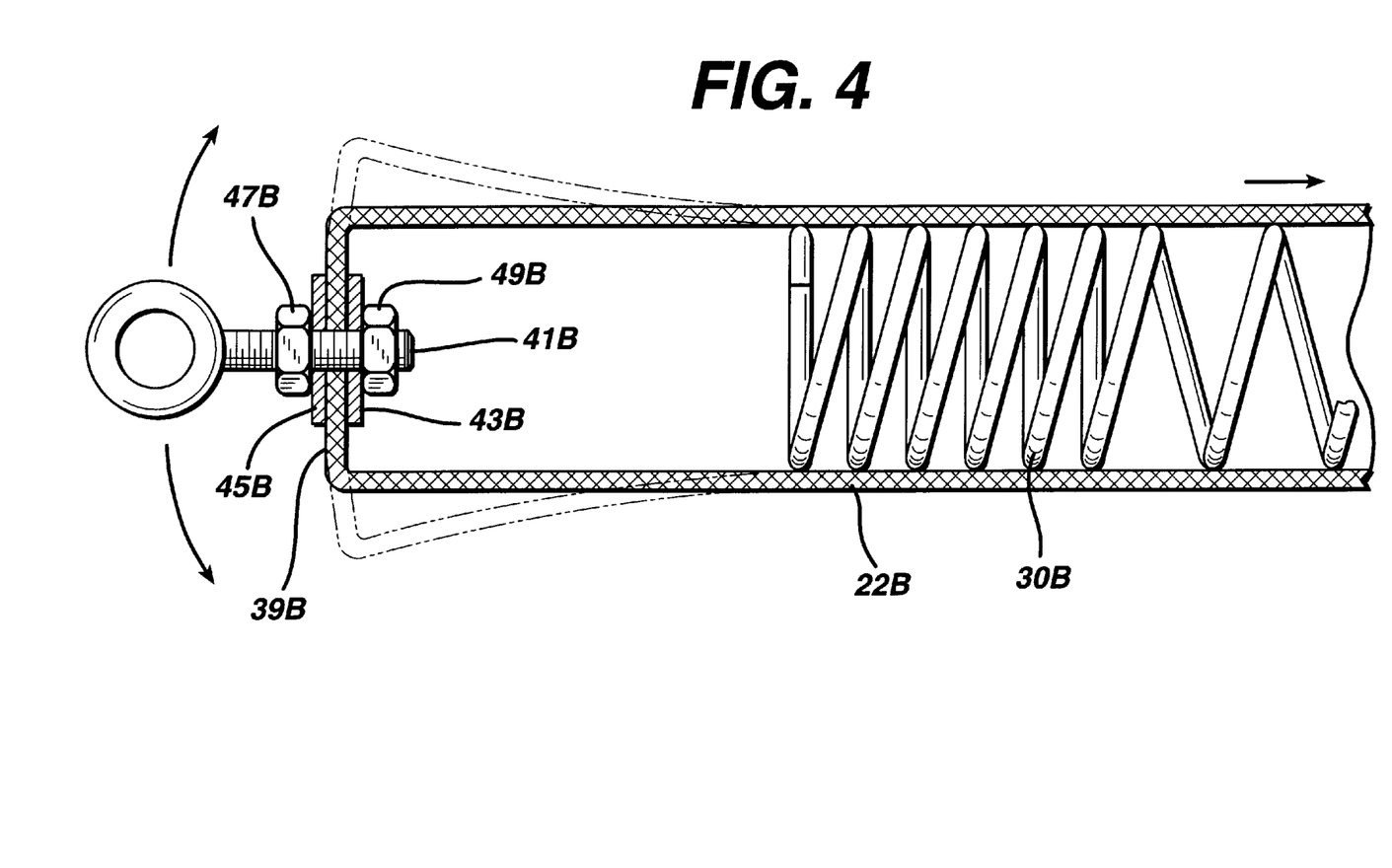
FIG. 4 is a view taken along lines 4—4 of FIG. 3.
Figure 5:
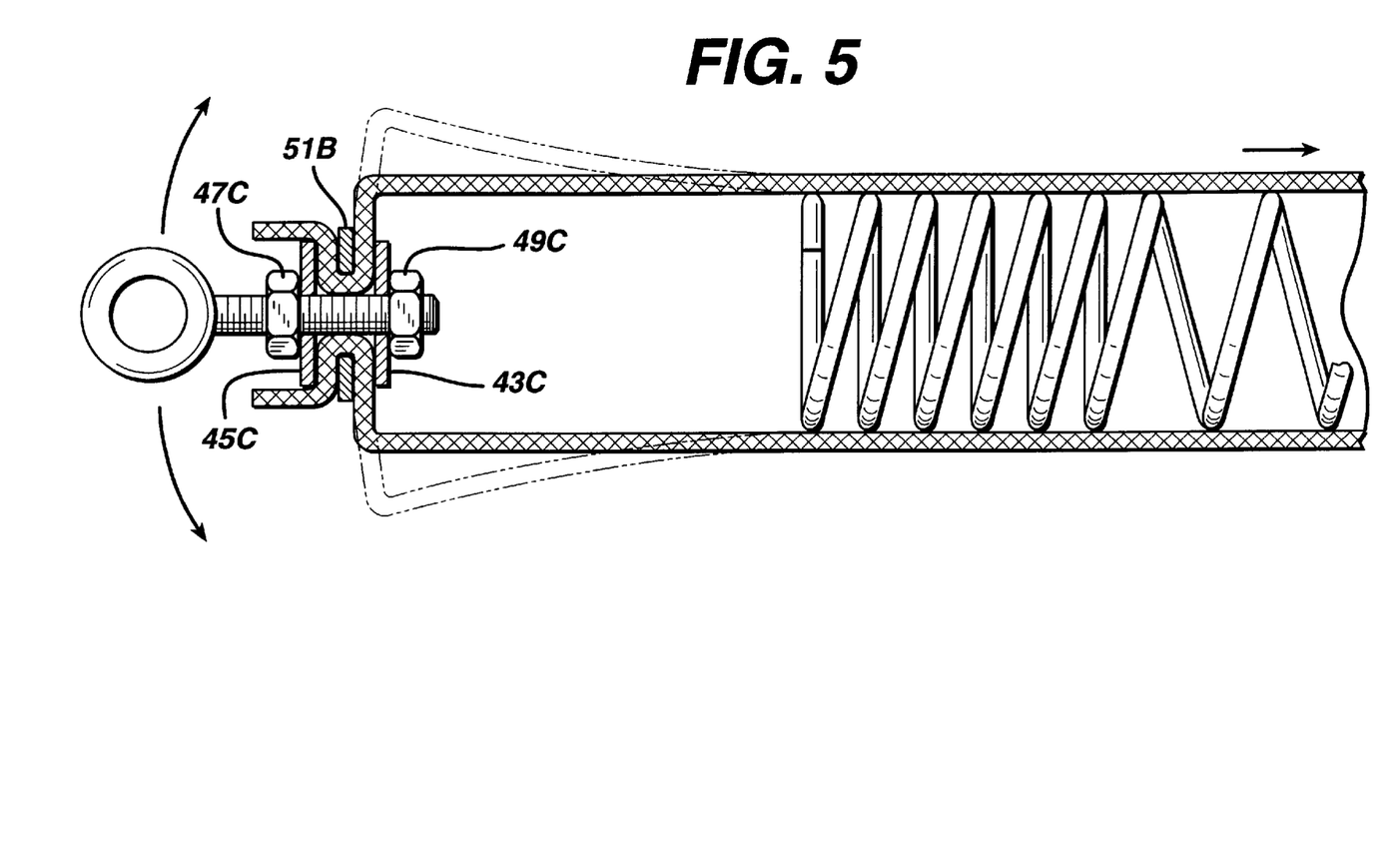
FIG. 5 is another embodiment of the invention showing a tube with a gathered end rather than a flat end.
Figure 6:
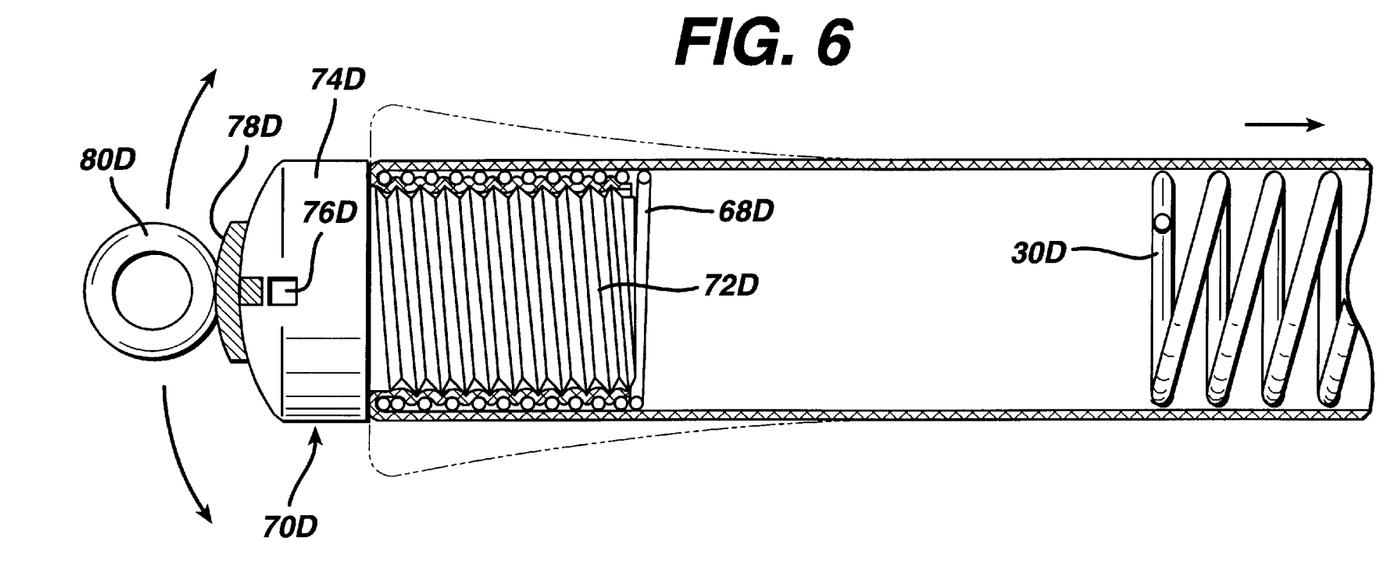
FIG. 6 shows another embodiment in which the very end portion of the filter tube is supported by a secondary spring and a portion of the tube in the lower third is unsupported internally so that oscillation at the end of the tube can be used to agitate the tube and shake the remote end of the tube to dislodge any accumulated contaminants.

Accordingly the end of the tube 38 remote from the spring end is unsupported and can be agitated by attachments to the end of the tube, as shown for example in FIGS. 4, 5 and 6.

Figure 3:
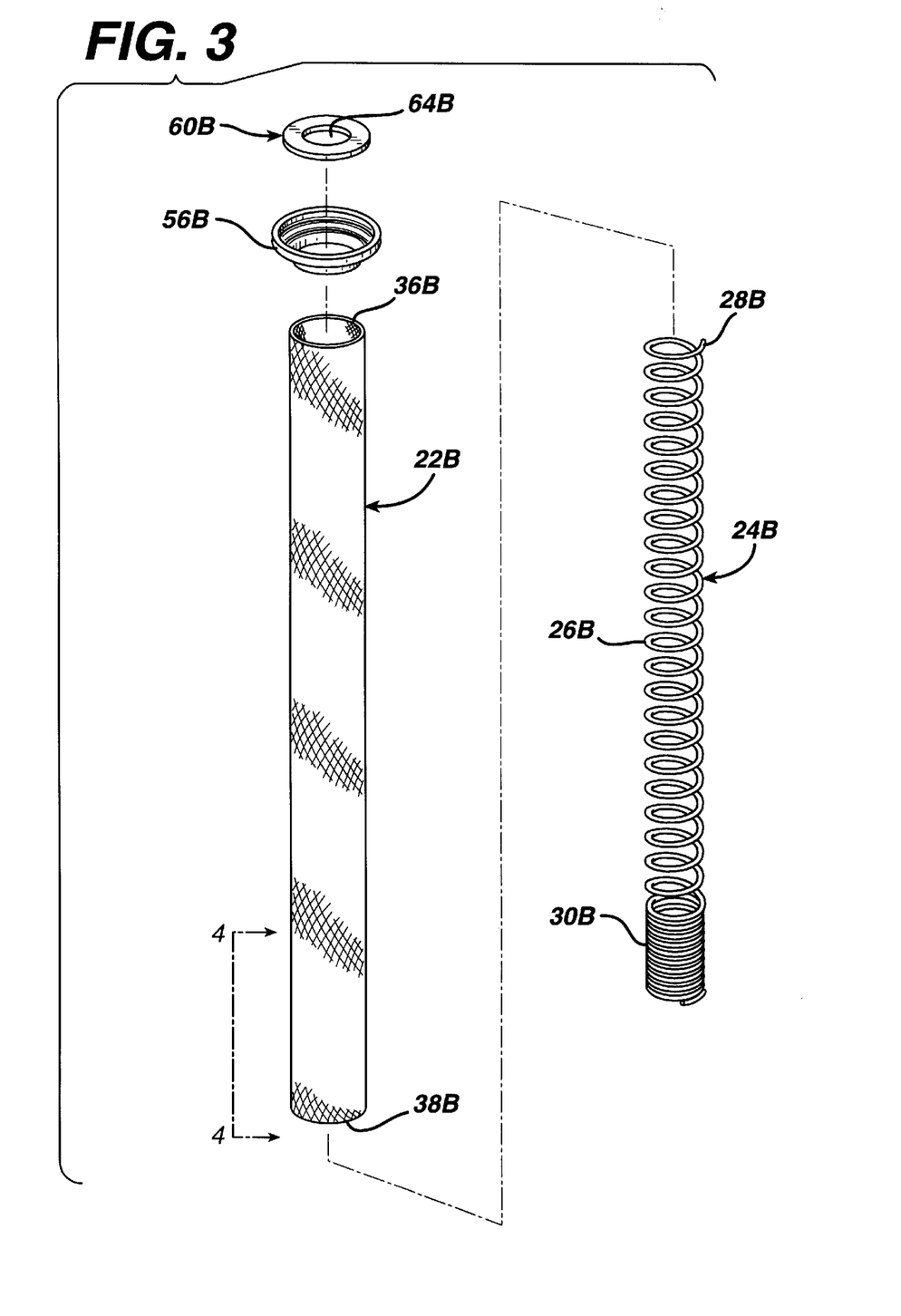
FIG. 3 shows an exploded view of a modified filter tube of the present invention.

FIG. 3 shows another embodiment of a tube similar to that in FIG. 2 with like items identified by like numbers with different suffix letters. FIG. 3 shows that the end of the spring 30B remote from the outlet end of the spring 28B has a compacted helical winding to give the free end of the spring greater body and more support for the wall of the tube 22B. The unsupported end 38B of the tube 22B is again spaced from spring end 30B. As shown in FIG. 4, the end of the tube is closed by means of a pair of washers 43B and 45B on either side of the wrapped around end 39B of the tube wall 22B. An eyebolt generally indicated at 41B has a threaded end which engages an internal locking nut 49B and an external locking nut at 47B which will squeeze the tube washers 43B and 45B to seal the end of the tube. The eye in the end of the eyebolt 41B can be used to fasten or attach the end of the filter tube to a convenient anchoring position and/or a convenient attaching means. Since the end of the tube is unsupported by the spring, it can be agitated by any external means connected to the eyebolt to shake the tube and dislodge any accumulated debris in bottom of the tube.

FIG. 5 shows another embodiment of the filter tube in which the end is sealed by means of gathering the braided wall of the tube by means of a gathering ring 51B between the internal and external washers 43C and 45C which in turn are held in place by internal and external nuts 49C and 47C, respectively.

FIG. 6 shows another embodiment of a filter tube in which the spring 30D ends substantially higher than in the previous tubes and the bottom of the tube contains a secondary spring indicated at 68D which has a compacted thread and which connects with a threaded plug generally indicated at 70D having a threaded portion 72D and a head portion 74D which will seal the end of the tube wall in a manner described more completely in U.S. Pat. No. 5,407,570 which is incorporated herein by reference.

The sealing plug 70D has a wrench passage 76D and has an eye hook 80D attached to the top of the plug by base 78D.

Figure 7:
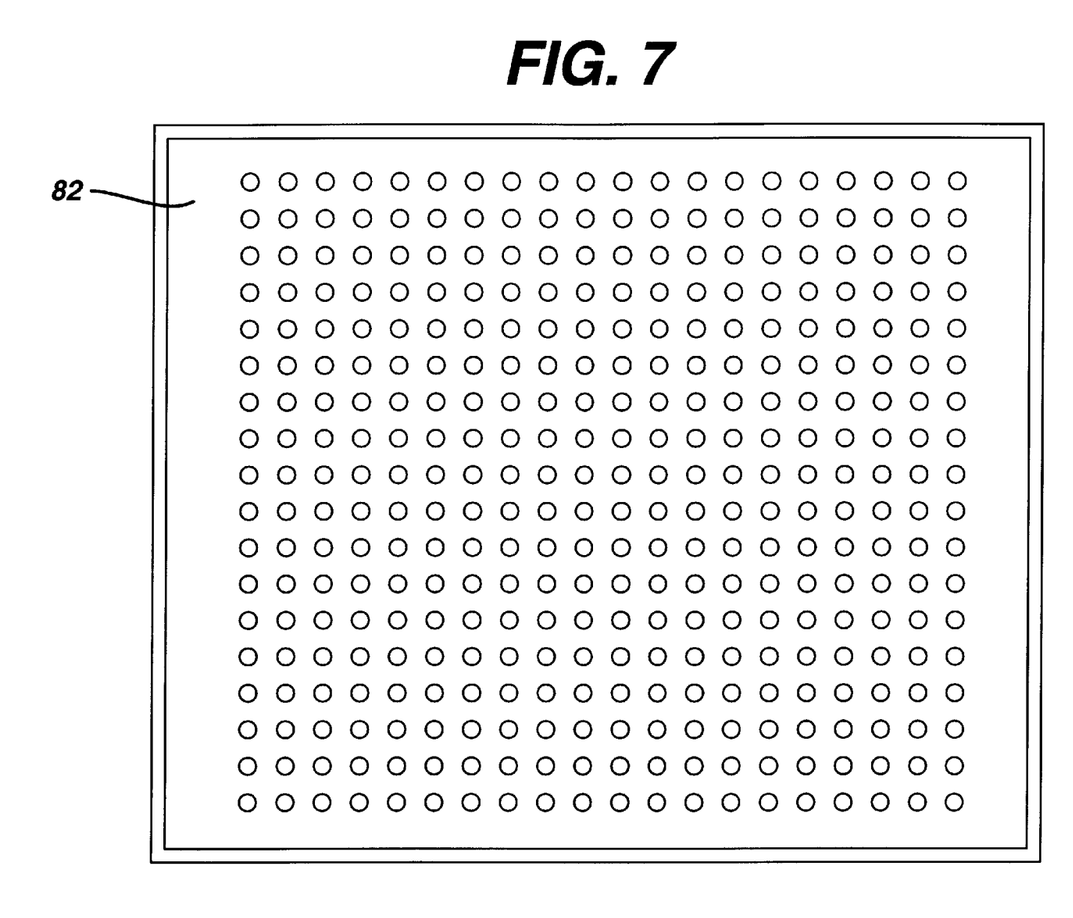
FIG. 7 shows a plan view of an anchoring plate to be attached to the remote ends of a plurality of tubes for oscillation and removal of contaminated powder.

As shown in FIG. 7, the apparatus of the present invention can be attached to a anchoring plate 82 which can be oscillated to agitate several tubes that form a filter, and which plate can then be moved towards or away from the outlet end of the filter ends or towards or away from the tube sheet to place the tubes under appropriate predetermined or controllable levels of tension during the filtering operation and appropriate levels of relaxation during the shaking or agitating operation.

Additionally, because the tubes are anchored to an anchor plate they need not be disposed vertically but can be horizontal or even inverted. Therefore, it is possible to utilize these tubes whether they are under pressure, which may be higher than atmospheric pressure on the unfiltered side of the tube sheet, or by means of a vacuum where there would be a pressure lower than atmospheric pressure on the filtered side of the tube sheet.

Figure 8A:
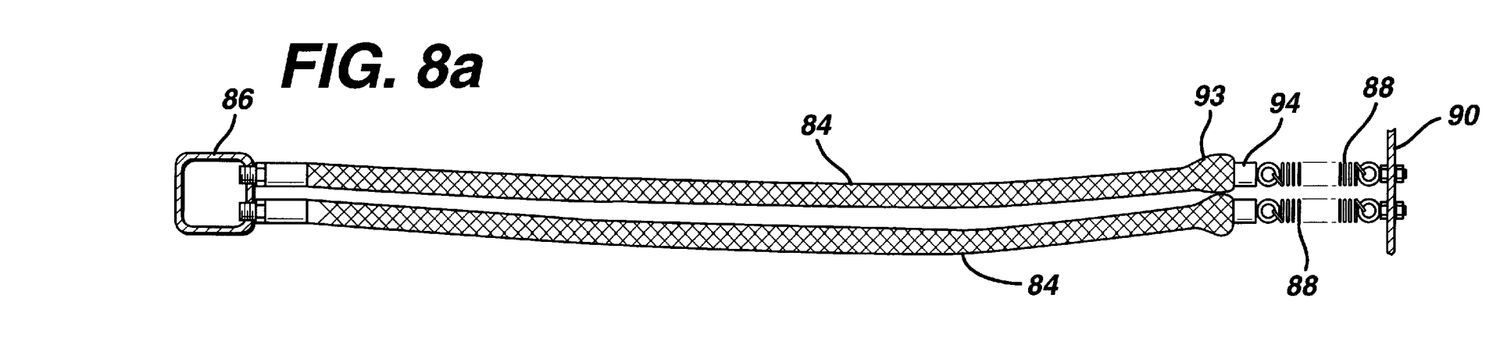
FIGS. 8a, and 8b and 8c show slack filter tubes with no tension at one end in FIG. 8a, with tension at one end in FIG. 8b, and a sectional view in FIG. 8c showing an internal support spring.
Figure 8B:
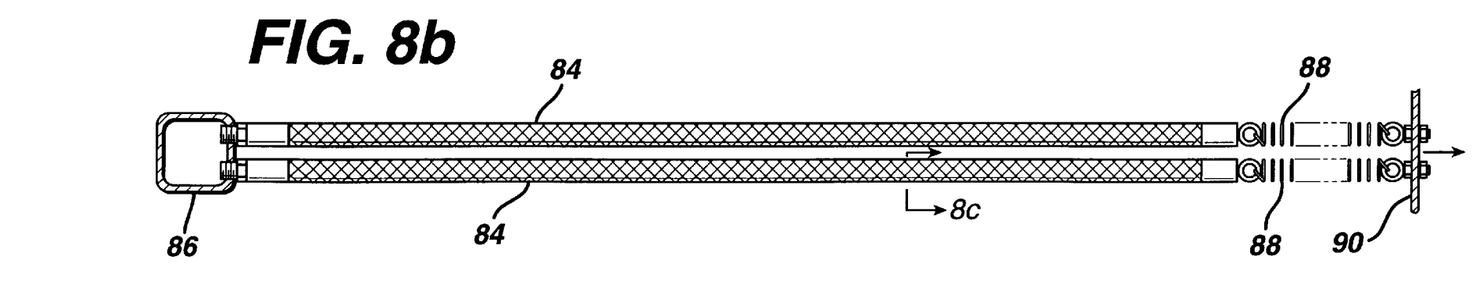
Figure 8C:
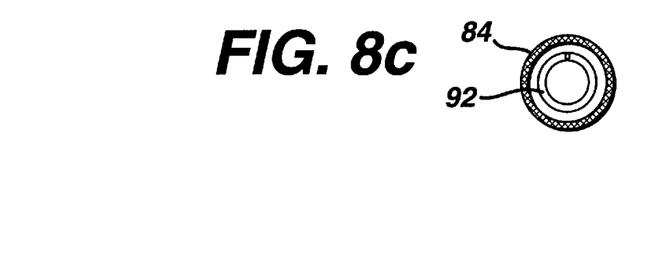

FIGS. 8a, 8b and 8c show another embodiment in which a pair of filter tubes include an elongated outer braided wall secured at one end to a tube sheet or manifold 86 and at the other end to a spring 88 and anchor plate 90. The tubes include an internal helical spring 92 connected to the opposite ends. As shown in FIG. 8a, the outer wall 84, spring 88 and anchor plate 90 are in a slack position with no tension applied by the anchor plate on spring 88. In this position, the loose unsupported braid at end 93 of wall 84 folds over the collar 94 which is secured around the end of the braid.

During normal filtering operations, the spring 92 will be tensioned as shown in FIG. 8b by movement of the anchor plate 90 to stretch the springs 88 and elongate the filter tubes 84. Elongation of the filter tubes 84 will eliminate the slack in the outer wall 84. The tube then is a relatively straight tube which will be supported over its entire length by the helical spring 92 disposed inside the tube. In this position, the tube can then be coated with a filtering aid in the conventional manner of a filtering tube and function within a filter housing in the same manner as is well known in the prior art as shown in the United States patents already incorporated by reference.

Additionally, when it is desired to remove the filtering aid from the tube and/or to eliminate the accumulated material within the filtering tube, the anchor plate is moved towards the tube sheet or manifold shortening the length of the tube under the influence of the internal spring 92 and relaxing the external springs 88. The outer wall of the tube 84 is then in a flaccid state with an accumulation on the outer wall at the gathered end of the tube 93. The tube can then be agitated by agitation of the anchor plate 90 or movement of the anchor plate causing agitation of the entire tube and the contents within the tube that would tend to cause a thorough backflushing of the internal contents of the tube into the tube sheet or manifold.

During the filtering cycle, when it is desired to operate in the normal filtering mode, the anchor plate is pulled outwardly or downwardly to apply tension to stretch spring 88 and cause tube wall 84 to stretch approximately ten percent (10%) and assume a full extended length in a taut position, as shown in FIG. 8b. About five (5) pounds of axial force per tube is applied to stiffen the elements. Internal support spring 92 is likewise extended. Anchor plate 90 may be oscillated as described in connection with FIG. 7 to control tension and relaxation applied to spring 88 and tube wall 84 during the agitation cycle.

Figure 9:
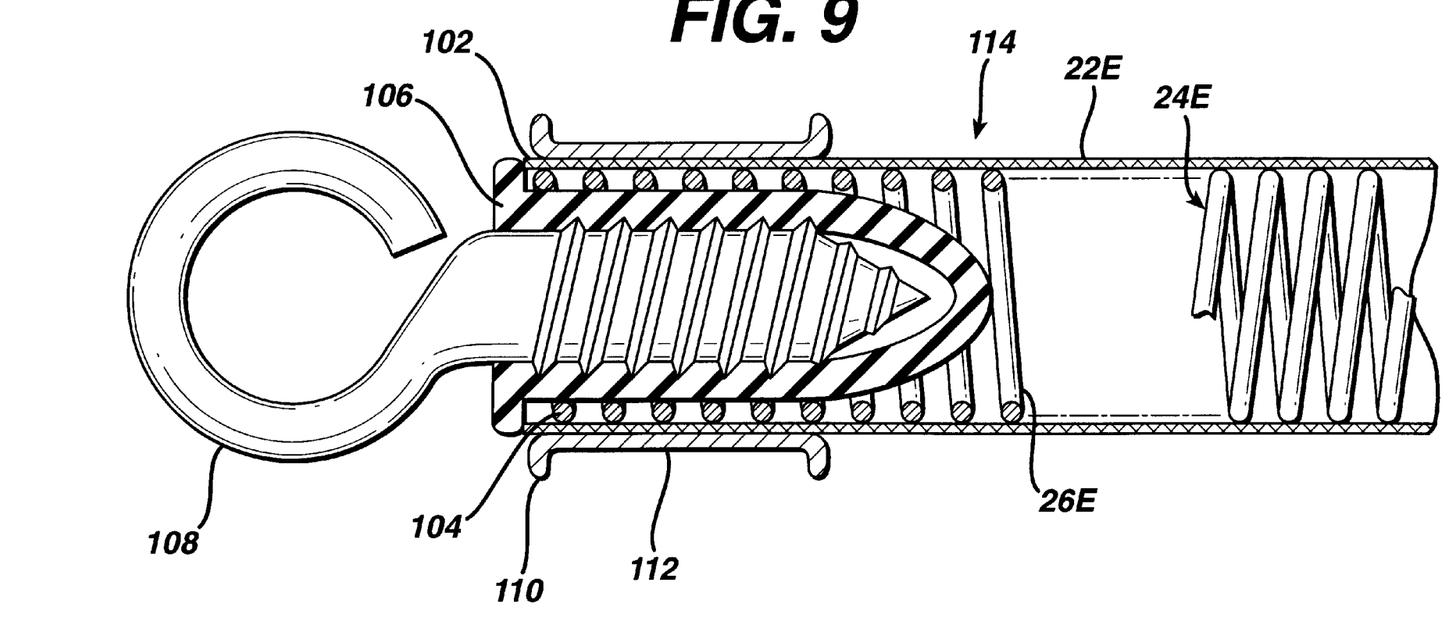
FIG. 9 shows another embodiment in which the end portion of the filter tube is sealed by an assembly which includes a screw eye inserted directly into a deformable member to seal the end of the tube.

FIG. 9 shows another embodiment of a filter tube in accordance with the present invention. In this embodiment, the filter tube 114 has a closed end which is formed by aligning the end of the tubular sheet 102 with the end of the internal support 104 namely the helical spring. A deformable member, such as a mollie 106, is then inserted into the end of the aligned ends of the tubular sheet and the spring and a sealing member such as a threadable hook eye 108 is inserted into the mollie which expands the mollie and forces the mollie or deformable member up against the spring and also against the wall of the tubular sheet. A collar or ferrule 110 is positioned around the aligned ends of the tubular sheet and the spring and is crimped 112 to further secure the seal between the wall of the tubular sheet and the deformable member and the inner sealing insert in order to seal the end of the tube.

Using this system of fabrication, the entire tube is formed by first taking a length of tubular sheet and inserting an internal support member such as a helical spring within the tubular sheet. The internal support member should be substantially shorter than the tubular sheet. The opposite ends of the tubular sheet and the internal support member can be aligned by compressing the tubular sheet. Since the tubular sheet is longer than the spring, when the spring is in a slack position with no tension applied by the hook eye, there will be a loose unsupported tubular braid portion.

As in the filtering operation of FIG. 8b, outward movement of the hook eye end stretches the spring and elongates the tube of the filter to eliminate the slack and permit conventional application of coating and filtering action. As the tube of the filter extends, the diameter of the tube will diminish and should contact the spring to support the tube sheet of the filter. Inward movement of the hook eye then relaxes the spring with the tube again becoming loose and unsupported. Agitation and movement of the hook eye with the spring and tube in the relaxed and unsupported states again results in removal of accumulated materials.

Accordingly, as can be readily seen, these filter tubes offer numerous advantages over the prior. They avoid the accumulation of particulate matter within the filter tube, they can operate at relatively high or relatively low pressures within the tube, they can be agitated to disturb the quiescent pocket that normally forms within the tube to eliminate accumulated particulates within the tube. Additionally, they offer a more reliable and dependable method of filtering which eliminates the chance inclusion of accumulated particulate matter in the filter.

While only a limited number of embodiments have been illustrated and described, other variations may be made in the particular configuration without departing from the scope of the invention as set forth in the appended claims.

What is claimed is:

1. A method of fabricating a filter tube comprising:

forming a length of flexible fluid permeable tubular sheet including a plurality of woven groups of strands, said tubular sheet having a supported end and an unsupported end;

inserting a helical spring having opposed inner and outer ends within the remote tubular sheet end;

positioning the inner spring end at the supported sheet end, the length of said helical spring in a relaxed state being substantially shorter than the length of the tubular sheet;

aligning the opposed ends of the spring while said spring is in said relaxed state with the supported and unsupported ends of the tubular sheet by compressing the tubular sheet;

fixing the aligned inner end of the spring to the supported tubular sheet end;

sealing the aligned outer end of the spring to the remote tubular sheet end by inserting a deformable member having an open end and a closed end inside the outer end of the helical spring, and inserting a threadable member into the open end of the deformable member to form a seal between the threadable member and the deformable member and the tubular sheet, such that the tubular sheet is slack when the spring is in said relaxed state.

2. The method of claim 1, further comprising the step of:
placing an external restraining collar at the sealed end.

3. The method of claim 2, further comprising the step of:
crimping the collar to squeeze the tubular sheet against the spring and the deformable member.

4. The method of claim 1, wherein the difference in length between the relaxed helical spring and tubular sheet provides an unsupported tubular sheet portion having increased flexibility permitting agitation of the sealed end to cause removal of accumulated materials.

5. The method of claim 1, including moving said sealed end outwardly to stretch said spring and elongate said tubular sheet to permit filtering action by said tubular sheet.

6. The method of claim 5, including moving said sealed end outwardly to reduce the diameter of said tubular sheet until the sheet contacts the spring substantially along its entire length.

7. A filter tube, comprising:

a length of flexible fluid permeable tubular sheet including a plurality of woven groups of strands, said tubular sheet having a supported end and a remote end;

a resilient internal support having inner and outer opposed ends within the tubular sheet, the length of said resilient internal support, when in a relaxed state, being substantially shorter than the length of the tubular sheet;

the opposed ends of the internal support being aligned within the opposed ends of the tubular sheet by compression of the tubular sheet to cause slack in the tubular sheet when the internal support is in the relaxed state;

the aligned supported end of the tubular sheet being fixed to the inner end of the internal support;

a seal at the remote sheet end including,
   a deformable member having a closed end positioned inside the outer end of the internal support and having an open end at the remote sheet end, and
   a sealing member inserted in the deformable member forming a seal between the sealing member and the deformable member and the tubular sheet.

8. A filter tube according to claim 7, further comprising:
   collar means disposed around the sealed end members forcing the tubular sheet into sealing contact with the deformable member.

9. The filter tube of claim 7, wherein said internal support is a helical spring.

10. The filter tube of claim 9, wherein the difference in length between the relaxed helical spring and the tubular sheet provide a slack tubular sheet portion having increased flexibility permitting agitation of the filter tube to remove accumulated materials.

11. The filter tube of claim 9, wherein said sealed end and spring and tubular sheet are in an extended position permitting filtering action by said tubular sheet.

* * * * *